United States Patent [19]
Imanari et al.

[11] Patent Number: 5,546,233
[45] Date of Patent: Aug. 13, 1996

[54] LENS BARREL USING A SURFACE WAVE MOTOR

[75] Inventors: Hitoshi Imanari, Kawasaki; Hideo Kanno, Chiba; Hiroshi Tanioka, Kashiwa, all of Japan

[73] Assignee: Nikon Corporation, Tokyo, Japan

[21] Appl. No.: 439,774

[22] Filed: May 12, 1995

Related U.S. Application Data

[62] Division of Ser. No. 77,861, Jun. 18, 1993, Pat. No. 5,418,650, which is a division of Ser. No. 794,971, Nov. 20, 1991, Pat. No. 5,239,415.

[30] Foreign Application Priority Data

Nov. 27, 1990 [JP] Japan ................. 2-324748

[51] Int. Cl.$^6$ ..................................... G02B 15/14
[52] U.S. Cl. ................. 359/696; 359/697; 359/698
[58] Field of Search ........................ 359/696, 697, 359/698; 354/400, 402

[56] References Cited

U.S. PATENT DOCUMENTS

| | | | |
|---|---|---|---|
| 4,796,045 | 1/1989 | Hamanishi et al. | 354/400 |
| 4,985,723 | 1/1991 | Egawa | 354/400 |
| 5,164,860 | 11/1992 | Suzuki | 359/696 |
| 5,198,935 | 3/1993 | Imanari | 359/698 |
| 5,315,340 | 5/1994 | Hirasawa | 354/400 |
| 5,420,721 | 5/1995 | Kanno | 359/697 |

FOREIGN PATENT DOCUMENTS 2-16343  5/1990  Japan .

*Primary Examiner*—Georgia Y. Epps
*Assistant Examiner*—Ricky Mack
*Attorney, Agent, or Firm*—Shapiro and Shapiro

[57] ABSTRACT

A lens barrel comprises a fixed barrel; a photographing lens which requires a first torque for driving the lens along the fixed barrel; and a surface wave motor including a fixed body and a moving body which is rotated relative to the fixed body by excitation for driving the lens. When the motor is not excited, a second torque is exerted between the moving body and the fixed body to prevent the relative rotation. The moving body is caused to rotate by a torque greater than the second torque. A friction generating device provided between the fixed barrel and the fixed body exerts a third torque to prevent relative rotation between the fixed barrel and the fixed body. The fixed body can rotate with respect to the fixed barrel only when the fixed body is caused to rotate by a torque greater than the third torque. A manual operation member drives the photographing lens by a manual operation; and a friction clutch provided between the manual operation member and the fixed body exerts a fourth torque. The manual operation member can rotate with respect to the fixed body only when caused to rotate by a torque greater than the fourth torque.

4 Claims, 3 Drawing Sheets

LENS BARREL USING A SURFACE WAVE MOTOR

This is a division of application Ser. No. 08/077,861 filed Jun. 18, 1993, now U.S. Pat. No. 5,418,650, which is a division of application Ser. No. 07/794,971 filed Nov. 20, 1991 (now U.S. Pat. No. 5,239,415).

BACKGROUND OF THE INVENTION

1. Field of the Invention

The present invention relates to a lens barrel using a surface wave motor for driving a photographing lens by the use of the surface wave motor.

2. Related Background Art

Traditionally, in a lens barrel using a surface wave motor, the contacting faces of the rotor and stator are strongly pressurized due to the driving principle of the surface wave motor. It is therefore necessary to rotate the rotor with a torque greater than the friction exerted between the rotor (moving body) and the stator (fixed body) when the photographing lens should be driven manually.

As a method of performing the manual driving of the photographing lens with ease, there has been known a first method in which the friction exerted between the rotor and stator is weakened (Japanese Patent Laid-Open Application No. 59-101608) or a second method in which the rotor and stator are set apart.

Also, there has been proposed a third method in which the moving body and fixed body of a surface wave motor are integrated for driving the photographing lens by interlocking its rotation with the manual operation of a manual operation member when a mode switching means is in manual mode and in which the fixed body is fixed to the lens barrel for driving the photographing lens by the rotation of the moving body in automatic mode, so that the photographing lens is driven without causing any damage on the contacting faces of the moving body and fixed body when a manual operation is performed (Japanese Patent Laid-Open Application No. 61-86718).

In the first method, although the friction is weak, the rotor is rotated in a state where it is still frictionally in contact with the stator. As a result, the contacting faces of the rotor and stator are caused to be worn unnecessarily. Also, in the second method where the rotor and stator are set apart, dust particles and the like are admitted between the rotor and stator, and a problem is encountered in that when the surface wave motor is driven, the contacting faces thereof are damaged due to such dust particles.

In the third method (disclosed in Japanese Patent Laid-Open Application No. 61-86718), friction is exerted on the contacting faces of the outer barrel of a surface wave motor and a fixed barrel so that the fixed body of the surface wave motor is not rotated in the fixed barrel even when a lens holding barrel is driven by the surface wave motor in the automatic mode, which is obtainable by sliding a switching means, whereas in the manual mode which is obtainable by sliding the switching means in the opposite direction, the friction exerted on the contacting faces of a manual ring and outer barrel is mechanically switched to be greater than the driving power which drives the lens holding barrel. It is therefore necessary to provide a complicated mechanism for this method.

Also, when the so-called manual mode preference photographing, is attempted in which the manual operation ring is rotated while photographing in automatic mode to switch it to manual mode instantaneously, or when the so-called go-home photographing function, is applied in which an arbitrary distance is stored in advance and the photographing lens is driven by the stored photographic distance subsequent to a photographing at another photographic distance, some mechanical switching system is required. However, it is extremely difficult to build in such a mechanism that can rapidly execute the switching for the manual mode preference photographing, go-home photographing function, or the like.

SUMMARY OF THE INVENTION

An object of the present invention is to provide a lens barrel using a surface wave motor, which enables the photographing lens to be driven manually without causing any damage on the contacting faces of the moving body and fixed body of the surface wave motor and at the same time, to provide a lens barrel using a surface wave motor, which is capable of performing a rapid switching for the manual mode preference photographing function, go-home photographing function, or the like.

In order to achieve the above-mentioned object, a lens barrel using a surface wave motor according to the present invention comprises a fixed barrel; a photographing lens which can travel freely with respect to the fixed barrel, a first torque (C) being required to drive the photographing lens with respect to the fixed barrel; a surface wave motor including a fixed body and a moving body, the moving body being rotated with respect to the fixed body by excitation and driving the photographing lens, the motor having means for exerting a second torque (A) between the moving body and the fixed body to prevent relative rotational movement thereof when the surface wave motor is not excited, and the moving body being rotated with respect to the fixed body only when the moving body is caused to rotate by a torque greater than the second torque (A); friction generating means provided between the fixed barrel and the fixed body, the friction generating means being arranged to exert a third torque (B) to prevent relative rotation between the fixed barrel and the fixed body, and the fixed body rotating with respect to the fixed barrel only when the fixed body is caused to rotate by a torque greater than the third torque (B); a manual operation member for driving the photographing lens by a manual operation; and a friction clutch provided between the manual operation member and the fixed body and arranged to exert a fourth torque (D) to prevent relative rotation between the manual operation member and the fixed body, the manual operation member rotating with respect to the fixed body only when the manual operation member is caused to rotate by a torque greater than the fourth torque (D); the relations of the torques A, B, C, D being C<B<A and B+C<D<A.

In this case, it is possible to arrange the structure so as to provide rotation stopping means for stopping the rotation of the stator of the aforesaid surface wave motor with respect to the aforesaid fixed barrel at the time of automatic focusing mode.

According to the present invention, the fixed body of the surface wave motor and manual operation member are integrally coupled to the fixed barrel of the lens barrel rotatively, and in manual operation mode, the moving body and fixed body of the surface wave motor are integrated to drive the photographing lens with its rotation interlocked with the manual operation of the manual operation member.

Also, in the manual focus preference automatic mode, the surface wave motor can be stopped to perform the instantaneous switching to the manual operation when the movement of the manual operation member is detected by the detecting means.

Further, in the automatic mode, the fixed body is fixed to the lens barrel, and the photographing lens is driven assuredly by the rotation of the moving body of the surface wave motor.

Therefore, it becomes possible to perform a series of switchings without any shifting of the fixed body and moving body of the surface wave motor. Accordingly, in performing the manual operation, the photographing lens can be driven without causing any damage on the contacting faces of the moving body and fixed body of the surface wave motor. Also, the manual and automatic mode switching in the manual focus preference automatic photographing or the like can be performed easily without a provision of any complicated mechanism.

DESCRIPTION OF THE PREFERRED EMBODIMENTS

Hereinafter, in reference to the accompanying drawings, an embodiment according to the present invention will be described.

Figures 1A, 1B:
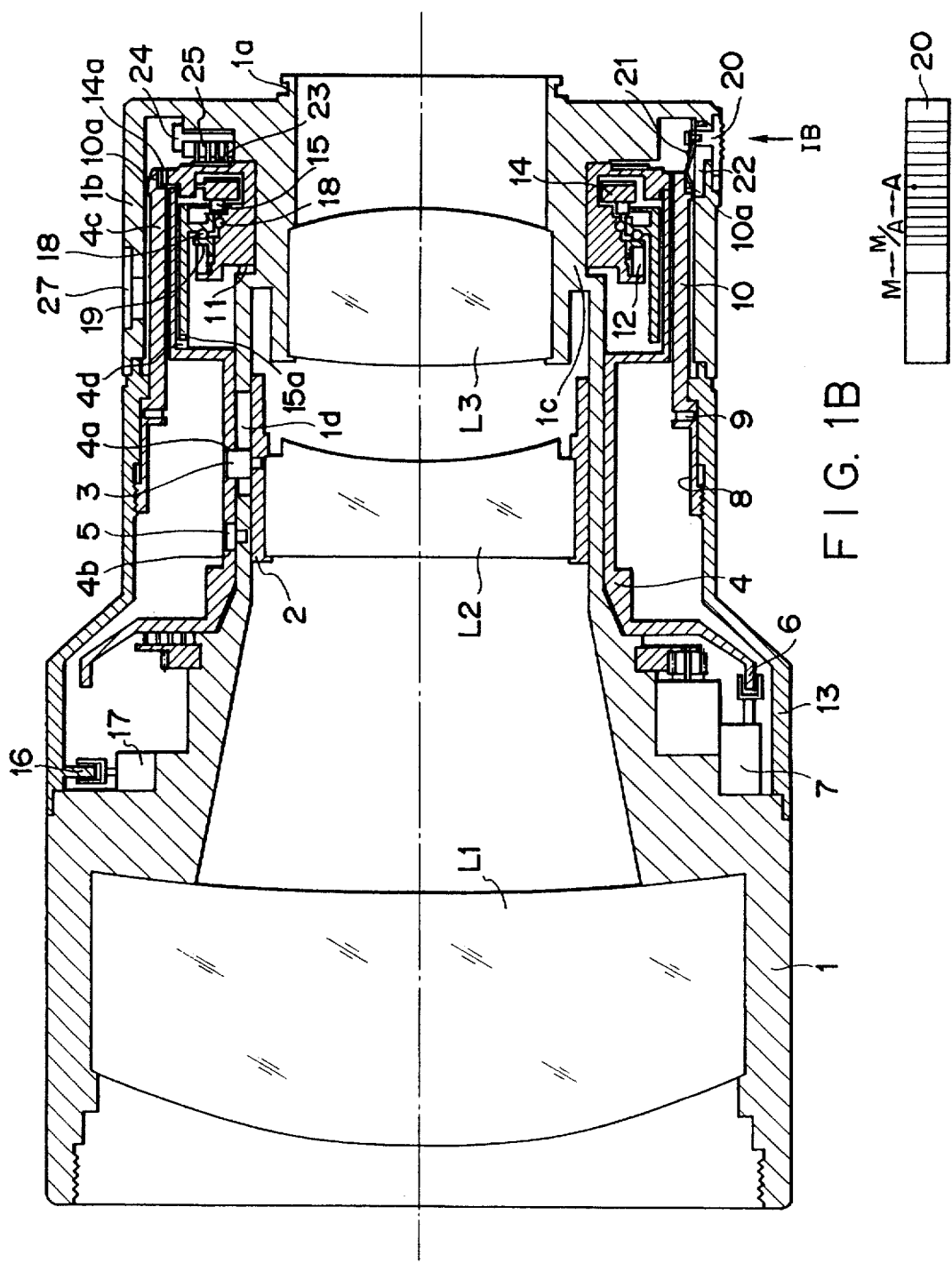
FIG. 1A is a longitudinal sectional view illustrating an embodiment of a lens barrel using a surface wave motor according to the present invention.
FIG. 1B is a view illustrating the mode change switch shown in FIG. 1A being observed in the direction indicated by arrow 1B.
Figure 2:
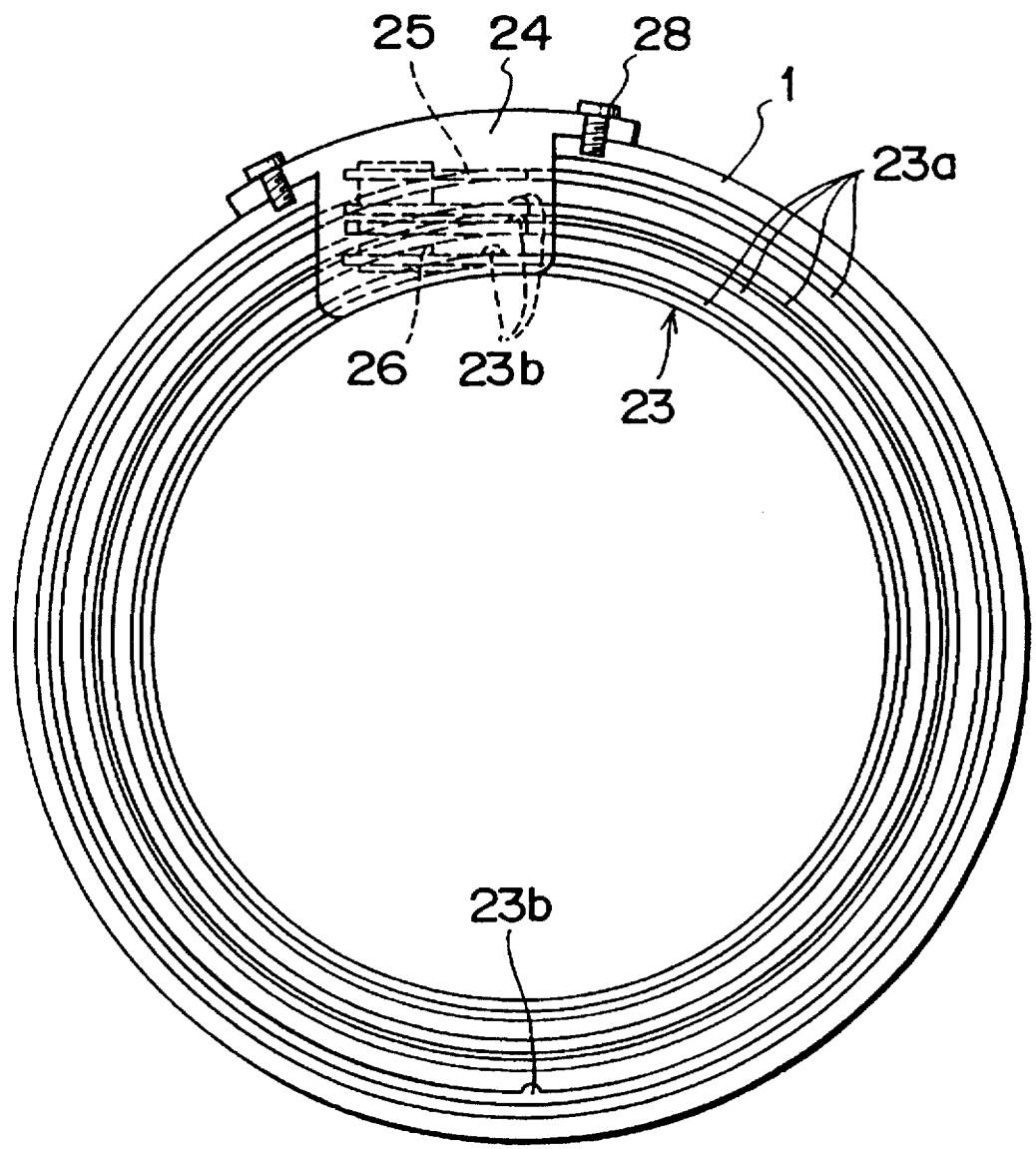
FIG. 2 is a transverse sectional view illustrating the power source supply section of the surface wave motor used for the embodiment.

FIG. 1A is a longitudinal sectional view illustrating the embodiment of a lens barrel using a surface wave motor according to the present invention and FIG. 2 is a transverse sectional view illustrating the power source supply section of the surface wave motor used for the embodiment.

As shown in FIG. 1A, a fixed barrel 1 has a bayonet member 1a for mounting it on a camera body and comprises an outer barrel 1b, and an inner barrel 1c. On the inner periphery of the inner barrel 1c, photographing optical systems L1 and L3 are held, and a lens holding barrel 2 is slidably provided to hold a focusing optical system L2.

In the lens holding barrel 2, a pin 3 is provided. This pin 3 fits in a linear guide groove 1d arranged in the inner barrel 1c as well as in a lead groove 4a provided in a cam ring 4 fitting rotatively on the outer periphery of the inner barrel 1c. When this cam ring 4 is rotated, the focusing optical system L2 is driven along the optical axis to perform focusing.

The movement of the cam ring 4 is regulated by the circumferential groove 4b provided on the cam ring 4 and the pin 5 provided on the fixed barrel 1, which fits in the groove 4b, so that its shifting in the axial direction is regulated and at the same time, its rotation around the optical axis is also limited to a specific rotational angle.

On the front side of the cam ring 4, the pattern section 6 of an encoder is provided. The pattern section 6 is detected by a detector 7 provided for the inner barrel 1c. Then, signals detected for the rotational direction and rotational angle of the cam ring 4 are transmitted to a CPU 110 in an exchangeable lens (refer to FIG. 3)

On the outer periphery of the fixed barrel 1, a manual operation ring 13 is rotatively fitted from the outside. On this manual operation ring 13, an encoder pattern 16 is provided as rotation detecting means, and signals for the rotational direction, and rotational angle, of the manual operation ring 13 are detected by a detecting section 17 fixed to the fixed barrel 1. These signals are transmitted to the CPU 110.

The stator (fixed body) 14 of the surface wave motor is rotatively fitted, with the optical axis as its center, on the outer periphery of the smaller diameter inner barrel 1c of the fixed barrel 1. On the outer periphery of this stator 14, a projection fitting 14a is provided. The projection fitting 14a fits in the fitting groove 10a of an intermediate ring 10. The intermediate ring 10 is made of transparent resin and is rotatively interlocked through a clutch spring 9 with a member 8 which is coupled to the manual operation member 13 integrally by a screw.

A window member 27 is provided in the larger outer barrel 1b of the fixed barrel 1 and is made of transparent resin. Through this window member 27, the distance calibrations marked on the outer periphery 4c on the right side of the cam ring 4 can be read through the intermediate ring 10 which is also made of transparent resin.

The rotor (moving body) 15 is frictionally in contact with the stator 14 and is rotatively supported by a bearing 18 with respect to the stator 14. On the left end side of the rotor 15, a fitting groove 15a is provided, and the structure is arranged so that the rotor 15 and the cam ring 4 are integrally rotated in the rotational direction when the projection fitting 4d of the cam ring 4 is coupled to this fitting groove.

A biasing member 11 is the member which gives a predetermined torque to the stator 14 so that the stator 14 cannot be rotated easily when the automatic mode is set in the manual focus preference automatic mode. Also, the biasing member 12 is the member which enables the stator 14 and rotor 15 to be frictionally in contact using the bearing 18 and a disc 19.

A glass epoxy plate 23 is fixed to the right end side of the stator 14 and as shown in FIG. 2, a conductive section 23a is provided like a ring on its entire periphery. Therefore, a brush 25 slides on the conductive section 23a to make its electrical connection with the stator 14 possible irrespective of the angle at which the stator 14 is currently positioned. In this respect, through holes 23b are provided in parts of the ring type conductive section 23a and the conductive portion is led to the reverse side of the glass epoxy plate 23 and connected electrically to the stator 14 from the reverse side thereof. A pressure plate 26 is a plate which enables the brush 25 to be fixed to a fixing plate 24. The fixing plate 24 is fixed to the fixed barrel 1 by screws 28.

A mode change switch 20 is slidably provided on the fixed barrel 1, and the right end side A is for automatic mode, the M/A in the middle, for the manual focus preference automatic mode, and the left end side M, for the manual mode as shown in FIG. 1B. The switch is structured so as to generate electric signals in accordance with the respective mode.

As shown in FIG. 1, when the mode change switch 20 is in a state where a operation is switched to the automatic mode A, flat spring 22 which is fixed to the fixed barrel 1 fits in the fitting groove 10a provided on the intermediate ring 10. Consequently, the rotations of the stator 14 and intermediate ring 10 are disabled.

Also, when the mode change switch 20 is shifted to the position of the manual focus preference automatic made M/A or to the manual mode M, a switching board 21 fixed to the mode change switch 20 by a small screw is moved simultaneously to thrust up the flat spring 22 fixed to the fixed barrel 1 to cause it to leave the fitting groove 10a. As a result, the rotations of the stator 14 and intermediate ring 10 become possible.

Here, given the frictional torque between the stator 14 and rotor 15 as A, the frictional torque generated between the fixed barrel 1 and stator 14 by the biasing member 11 as B, the torque required for driving the lens holding barrel 2 as C, and the torque generated between the intermediate ring 10 and manual operation ring 13 by the clutch spring 9 as D, conditions, C<B<A and B+C<D<A, are satisfied.

Subsequently, the operation of the embodiment of a lens barrel using a surface wave motor according to the present invention will be described.

In the automatic mode, the mode change switch 20 is at the position of the automatic mode A, and the flat spring 22 fits in the fitting groove 10a of the intermediate ring 10. Therefore, the rotations of the intermediate ring 10 and the stator 14 are disabled. Here, if source power is supplied to the surface wave motor by a control mechanism (not shown), a surface propagation wave is generated on the stator 14 to cause the rotor 15 to rotate in the circumferential direction. When the rotor 15 is rotated, the rotor 15 and cam ring 4 are allowed to rotate integrally because the fitting projection 4d of the cam ring 4 and the fitting groove 15a of the rotor 15 are coupled. When the cam ring 4 is rotated, the lens holding barrel 2 is driven along the optical axis to perform automatic focusing adjustment.

When the operation is in the manual mode, the mode change switch 20 is shifted to the position of the manual mode M shown in FIG. 1B. At the same time, the power supply to the surface wave motor is turned off. In other words, when the switch 20 slides to the manual mode M position shown in FIG. 1B, the switching board 21 fixed to the switch 20 by a small screw is also shifted to thrust up the flat spring 22 fixed to the fixed barrel 1, thus enabling the flat spring 22 to leave the fitting groove 10a. In this state, the rotations of the intermediate ring 10 and stator 14 become possible while the power supply to the surface wave motor is turned off. Accordingly, the surface wave motor is not rotated.

At this juncture, if the frictional torque between the stator 14 and rotor 15 is given as A, the frictional torque generated between the fixed barrel 1 and stator 14 by the biasing member 11 as B, the torque required for driving the lens holding barrel 2 as C, and the torque generated between the intermediate ring 10 and manual operation ring 13 by the clutch spring 9 as D, conditions, C<B<A and B+C<D<A, are satisfied as described earlier. Therefore, if the manual operation ring 13 is rotated, then the intermediate ring 10 and stator 14 are rotated through the clutch spring 9.

The rotor 15 is also rotated, and the rotor 15 and cam ring 4 are rotated integrally because the fitting groove 15a of the rotor 15 and the fitting projection 4d of the cam ring 4 are coupled. As the cam ring 4 is rotated, the lens holding barrel 2 is driven along the optical axis to perform the manual focusing adjustment.

Also, in a case where the rotation of the cam ring 4 is disabled by the rotational limit, the manual operation ring 13 slips by the function of the clutch spring 9 if the manual operation ring 13 is attempted to be further rotated in the direction of the rotational limit. In this case, there is no slip occurring between the rotor 15 and stator 14 because of the aforesaid torque conditions.

In the manual focus preference automatic mode, the mode change switch 20 is shifted from the automatic mode A position to the position of the manual focus preference automatic mode M/A shown in FIG. 1B. At this juncture, the switching bard 21 fixed to the switch 20 by the small screw is also shifted to thrust up the flat spring 22 fixed to the fixed barrel 1, thus allowing the flat spring 22 to leave the fitting groove 10a.

In this state, the rotations of the intermediate ring 10 and stator 14 become possible while the power supply to the surface wave motor is turned on. As a result, the surface wave motor is driven to make photographings in the automatic mode possible unless the manual operation ring 13 is rotated. This is because, as described earlier, the condition C<B is satisfied, where B is the frictional torque generated between the fixed barrel 1 and stator 14 by the biasing member 11 and C is the torque required to drive the lens holding barrel 2.

If the manual operation ring 13 is rotated while the operation is being performed in the manual focus preference automatic mode M/A, then the rotational signal of the manual operation ring 13 is detected by the encoder pattern 16 of the rotation detecting means and the detecting section 17 fixed to the fixed barrel 1 and at the same time, the power supply to the surface wave motor is turned off. Thereafter, it becomes possible to perform the operation in the same way as in the manual mode.

Here, given the frictional torque between the stator 14 and rotor 15 as A, the frictional torque generated between the fixed barrel 1 and stator 14 by the biasing member 11 as B, the torque required for driving the lens holding barrel 2 as C, and the torque generated between the intermediate ring 10 and manual operation ring 13 by the clutch spring 9 as D, conditions, C<B<A and B+C<D<A, are satisfied as described earlier. Consequently, if the manual operation ring 13 is rotated, the intermediate ring 10, stator 14, and rotor 15 are rotated through the clutch spring 9.

Now, as the fitting groove 15a of the rotor 15 and the fitting projection 4d of the cam ring 4 are coupled, the rotor 15 and cam ring 4 are integrally rotated when the rotor 15 is rotated. With the rotation of the cam ring 4, the lens holding barrel 2 is driven along the optical axis to perform the manual focusing adjustment.

Also, in a case where the rotation of the cam ring 4 is disabled by the rotational limit, the manual operation ring 13 slips by the function of the clutch spring 9 if the manual operation ring 13 is attempted to be further rotated in the direction of the rotational limit. In this case, there is no slip occurring between the rotor 15 and stator 14 because of the aforesaid torque conditions.

Figure 3:
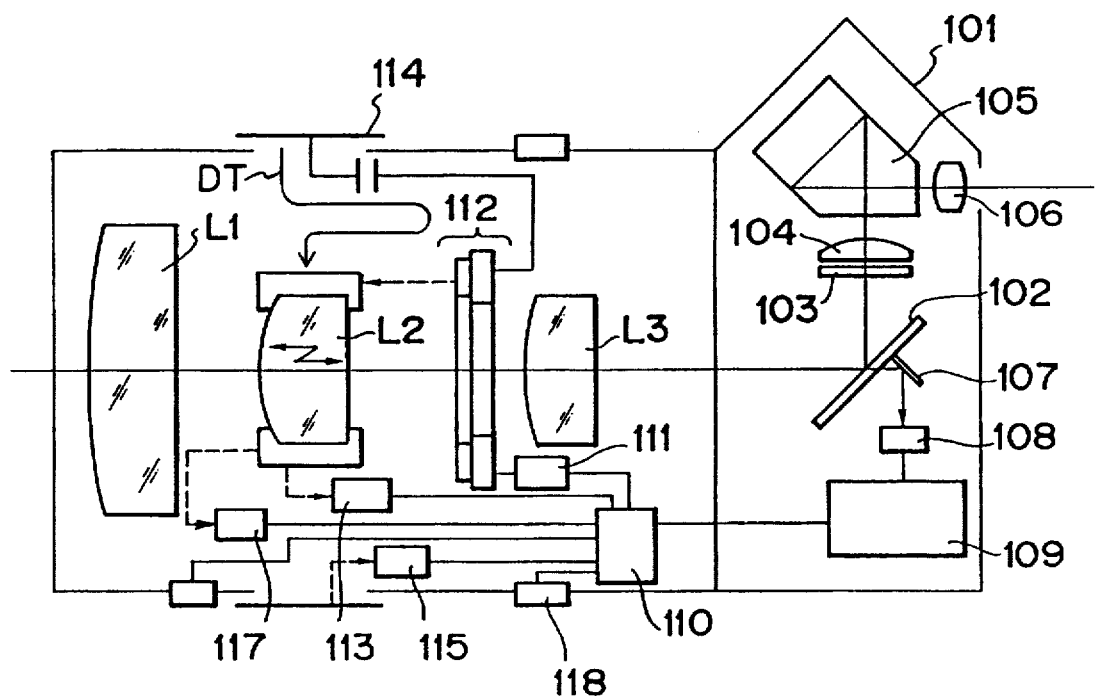
FIG. 3 is a schematic system diagram showing the state in which a lens barrel using a surface wave motor according to the present invention is mounted on a camera body.

FIG. 3 is a schematic system diagram showing a state in which a lens barrel using a surface wave motor according to the present invention is mounted on a camera body.

At first, a description will be given of the case of the automatic focusing adjustment (AF) mode.

When the AF mode is selected by the mode change switch 118 which can be operated from the outside, a signal that indicates the AF mode is transmitted to the CPU 110 in an exchangeable lens. Thus, the CPU 110 causes the surface wave motor 112 (corresponding to 14 and 15 in FIG. 1) to be driven through a driving circuit 111 for the surface wave motor, and the state becomes such that the driving power of the surface wave motor 112 can be transmitted to the focusing optical system L2.

As shown in FIG. 3, light beams from the object reache a semi-transparent mirror 102 of the camera body 101 through the photographing lens L1–L3, and a part of the light beams is reflected to form the image of the object on the focus plate 103. This object image is introduced to the eyes of a photographer through a condenser lens 104, pentaprism 105, and finder ocular lens 106.

Also, a part of the light beams passing through the semi-transparent mirror 102 is reflected by a sub-mirror 107 to be guided to a ranging photoelectric conversion section 108. The output signals from this photoelectric conversion section 108 are output to a known focus control circuit 109. By this focus control circuit 109, the driving direction and driving amount of the focusing optical system L2 are determined.

These signals are transmitted to the CPU 110 to drive the surface wave motor 112 through the motor driving circuit 111, and the motor driving is continued until the focusing optical system L2 is driven by the aforesaid driving amount, as detected by a feedback device 113. Then, when the driving is terminated, the focusing state is again detected. If the focusing is yet to be performed, the aforesaid driving is repeated until the focalization becomes complete.

In the rotation limiting section of the cam ring 4, a limit circuit 117 is provided to transmit signals to the CPU 110 in the lens barrel when the focusing optical system L2 reaches the position in the infinite side or in the closest side, so that the driving direction of the focusing optical system L2 is reversed.

As set forth above, the focusing optical system L2 is driven by the automatic focusing adjustment (AF), thus making it possible to obtain the focusing state of a desired object.

Now, the case of the manual focusing adjustment (MF) mode will be described.

Referring to FIG. 3, when the manual focusing adjustment mode MF is selected by the mode change switch 118 which can be operated from a outside, the signal indicating the MF mode is output to the CPU 110. Thus, the CPU 110 causes the surface wave motor to stop its driving, and prepares the state where the rotation of the manual operation ring 114 can be transferred to the focusing optical system L2 by a completely mechanical drive train (described later)

More specifically, the flat spring 22 is caused to leave the fitting groove 10a shown in FIG. 1. In this state, the intermediate ring 10 and stator 14 become rotatable while the power supply to the surface wave motor 112 is turned off. Therefore, the surface wave motor 112 is not actuated.

Here, given the frictional torque between the stator 14 and rotor 15 as A, the frictional torque generated between the fixed barrel 1 and stator 14 by the biasing member 11 as B, the torque required for driving the lens holding barrel 2 as C, and the torque generated between the intermediate ring 10 and manual operation ring 13 by the clutch spring 9 as D, conditions, C<B<A and B+C<D<A, are satisfied. Consequently, when the manual operation ring 13 (114 in FIG. 3) is rotated, the intermediate ring 10, stator 14, and rotor 15 are rotated through the clutch spring 9.

When the rotor 15 is rotated, the rotor 15 and cam ring 4 are rotated integrally because the fitting groove 15a of the rotor 15 and the fitting projection 4d of the cam ring 4 are coupled. With the rotation of the cam ring 4, the lens holding barrel 2 is driven along the optical axis mechanically to perform the manual focusing adjustment. It is apparent that the completely mechanical drive train referred to earlier includes elements 9, 10, 14, 15, 4, and 2 in FIG. 1, indicated diagrammatically by arrow DT in FIG. 3.

Also, in a case where the rotation of the cam ring 4 is disabled by the rotational limit, the manual operation ring 13 slips by the function of the clutch spring 9 if the manual operation ring 13 is attempted to be further rotated in the direction of the rotational limit. In this case, there is no slip occurring between the rotor 15 and stator 14 because of the aforesaid torque conditions.

A photographer rotates the manual operation ring 114 while looking into the finder ocular lens 106 to perform the manual focusing operation. At this juncture, the operation of the focus controlling circuit 109 is at rest.

Last, the case of MF preference AF mode will be described.

When the MF preference AF mode is selected by the mode change switch 118 which can be operated from the outside, a signal indicating the MF preference AF mode is output to the CPU 110. Then, the CPU 110 prepares the same state as in the AF mode, i.e., to actuate the driving circuit of the surface wave motor 112 so that the driving power of the surface wave motor 112 can be transmitted to the focusing optical system L2.

Then, if the operation should be switched to the MF mode, for the reason that focusing becomes disabled in performing an AF or the like, the photographer can simply rotate the manual operation ring 114 to perform an MF operation without using the mode change switch 118. In this way, the rotation detecting device 115 detects the rotation of a manual operation ring 114 to output the corresponding signal to the CPU 110. The CPU 110, having received such signal, causes the surface wave motor 112 to stop its driving immediately, and prepares the same state as in the MF mode, i.e., the operation of the focus controlling circuit 109 is at rest while the rotation of the manual operation ring 114 becomes transferable to the focusing optical system L2. Hence, the photographer is enabled to perform the MF operation at once without a switching operation of MF—AF by the use of the mode change switch 118.

Also, if it is desired to return from an MF state to AF state in the MF preference AF mode, it may be possible to make an arrangement so that the surface wave motor 112 is driven by actuating the motor driving circuit 111 with an output signal indicating the return from the MF state to AF state after a predetermined time has elapsed without signals being generated by the rotation of the MF operation ring, or by outputting to the CPU 110 in the lens a signal generated by a repeated half depressing of the release button on the camera body, the motor driving circuit 111 being actuated on the basis of this signal to drive the surface wave motor 112.

As described above,-according to the present invention, it is possible to perform an MF photographing by rotating the manual operation ring 13 without any special switching operation even in performing an AF photographing if the MF preference AF mode is has been selected by the mode change switch 118. Therefore, while an AF photographing is performed in a usual photography, an MF photographing can be performed smoothly by rotating the manual operation ring if an object for which focusing is difficult should be photographed or an intentional blurring is desired. Hence, the operatively can be improved significantly.

According to the present invention set forth above, there is no damage given to the contacting faces of the moving body and fixed body of a surface wave motor even when the rotation of the moving body of the surface wave motor is disabled, because the manual operation member and the fixed body slip by the function of the friction clutch provided between the manual operation member and the fixed body.

Also, when the manual operation member is rotated, the moving body and fixed body of the surface wave motor are integrated, and by the rotation thereof which is interlocked with the manual operation of the manual operation member, the photographing lens is driven and at the same time, the surface wave motor is stopped by detecting the rotation of the manual operation ring. As a result, it becomes possible to perform the switching of a manual mode and automatic mode in the manual preference automatic mode photographing or the like just by the provision of electric signals, thus making it unnecessary to build in a complicated mechanism for performing a rapid switching as required in the conventional art.

Furthermore, in the automatic focusing mode, the rotational movement of the stator of the surface wave motor and the manual operation member are disabled so as to perform the driving by the surface wave motor assuredly.

What is claimed is:

1. A photographing apparatus comprising:
   a) a photographing device having a plurality of focus adjustment modes, including an automatic focus mode and a manual focus mode, having a focus lens and an autofocus drive motor mechanically connected to said focus lens in both of said autofocus and manual focus modes, and having a release switch operable to control said photographing apparatus;
   b) a selector which selects one of the plurality of focus adjustment modes;
   c) an operation device operable to set a specific one of the plurality of focus adjustment modes; and
   d) a control device which, when said operation device is not operated, enables the focus adjustment mode selected by said selector, and which, when said operation device is operated, enables the specific focus adjustment mode regardless of the state of said selector;
   wherein said control device returns to enabling the focus adjustment mode selected by said selector before the operation of said operation device, in response to a re-operation of said release switch.

2. An apparatus according to claim 1, wherein said operation device sets the manual focus mode.

3. An apparatus according to claim 1, wherein said operation device is a manually actuated member and wherein, in said manual focus mode, said manually actuated member is connected to said focus lens by a completely mechanical drive train.

4. An apparatus according to claim 3, wherein said autofocus motor has a rotor and a stator, wherein in the autofocus mode the rotor is driven electrically so as to rotate relative to the stator and to drive said focus lens, and wherein in the manual focus mode, the rotor is driven mechanically with the stator to drive said focus lens.

* * * * *